Dec. 24, 1968    C. L. SEEFLUTH    3,418,398
METHOD OF HEATING PARISON PREFORMS
Filed Aug. 7, 1967    2 Sheets-Sheet 1
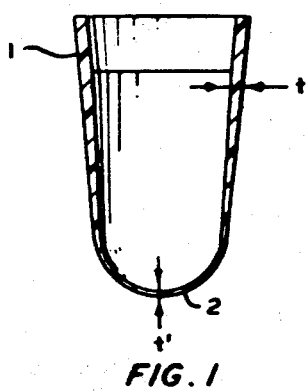
FIG. 1
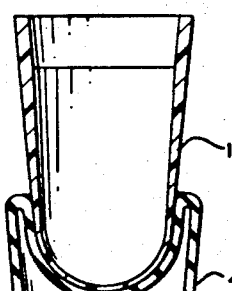
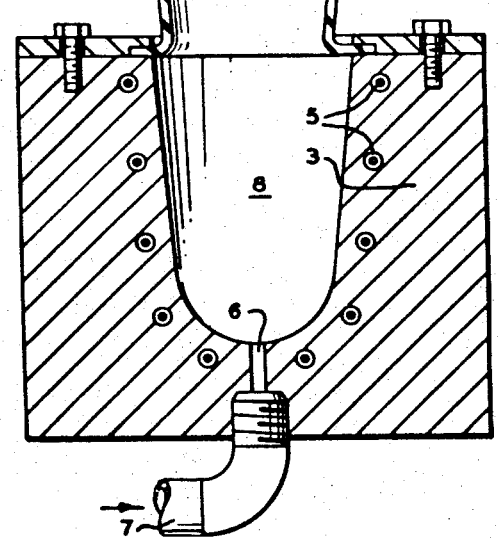
FIG. 2a                FIG. 2b
INVENTOR.
C.L. SEEFLUTH
BY
Young + Quigg
ATTORNEYS INVENTOR
C.L. SEEFLUTH
BY
Young + Quigg
ATTORNEYS United States Patent Office 3,418,398
Patented Dec. 24, 1968

3,418,398
METHOD OF HEATING PARISON PREFORMS
Charles L. Seefluth, Bartlesville, Okla., assignor to Phillips Petroleum Company, a corporation of Delaware
Continuation-in-part of application Ser. No. 437,175, Mar. 4, 1965. This application Aug. 7, 1967, Ser. No. 658,685
6 Claims. (Cl. 263—52)

ABSTRACT OF THE DISCLOSURE

A hollow parison used for blow molding hollow articles is heated by placing the parison into a high heat conductivity mold having a flexible, low heat conductivity liner, heating the mold to a temperature sufficient to heat the parison to a temperature below the crystalline melt point of the parison, and removing the parison from the mold. In a preferred embodiment, fluid pressure is applied between the mold and the liner after the parison reaches the desired temperature, the liner then pushing the parison from the mold so that the liner is peeled from the parison.

Cross references to related applications

This is a continuation-in-part of application Ser. No. 437,175, filed Mar. 4, 1965, now U.S. Patent No. 3,347,966.

Background of invention

This invention relates to heating a parison.

Blow molded objects can be formed in two ways. One method is to extrude a parison, place the hot parison into an article mold and blow the parison in the mold. Another method is to extrude a parison of a particular shape, let the parison cool, reheat to a desired temperature (which, if oriented articles are desired, is a temperature slightly below the crystalline melt point of the polymer), place the reheat parison in an article mold and blow the parison. In the latter method, and particularly if oriented articles are desired, it is necessary to uniformly heat the parison so that the expansion takes place uniformly when the parison is blown. It is also necessary to remove the parison carefully so that no distortion of the parison takes place before the blowing operation.

A problem encountered in blow molding of thermoplastic articles, in particular oriented thermoplastic articles such as oriented bottles, is distributing the materials so that the finished article has the wall thickness which is essentially the same throughout. Variations in wall thickness may be caused by a portion of the parison being heated to a temperature which is just slightly different from that of the remainder of the parison; this slight difference in temperature in a thermoplastic material at just below its crystalline melting point is sufficient to cause uneven blowing of the parison.

Summary of invention

It is an object of this invention to provide a method for heating a hollow thermoplastic parison.

According to the invention, a parison having a closed end is heated to a temperature just below the crystalline melting point of the parison material in a mold which has a high thermal conductivity and which has a flexible liner made of a material which has a thermal conductivity which is low relative to that of the mold.

Brief description of the drawings

In the drawings, forming a part hereof, in which like reference characters indicate like parts in the various views, FIGURE 1 is a cross section through a parison; FIGURE 2a is a cross section through a heating apparatus showing heating of the parison; FIGURE 2b is a cross section through the heating apparatus showing the method of removal of the heated parison.

Description of the preferred embodiments

Figure 3A:
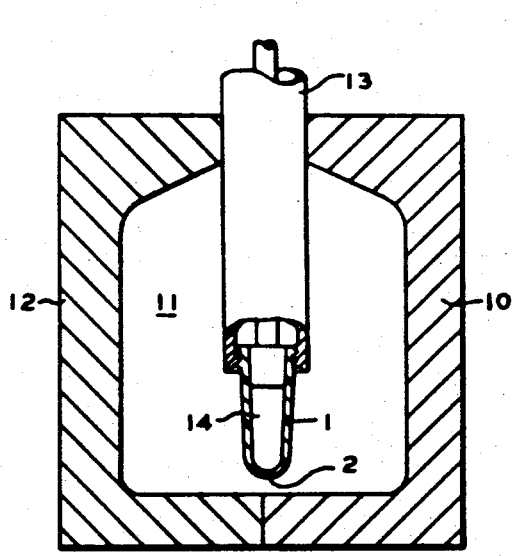
FIGURES 3a, 3b, 3c, and 3d are cross-sectional views through a mold showing the various stages of blowing the parison.

Preformed parisons can be heated in accordance with the instant invention to any temperature up to the crystalline melting point. Generally the parisons will be heated to a temperature from about 1 to about 50 degrees F. below the crystalline melting point. At this temperature the plastic undergoes maximum orientation on stretching to yield a product having greatly increased strength and clarity.

The crystalline melt point of polymers such as polypropylene and polyethylene can be determined by heating a small piece of the plastic (usually film) between cross polaroids under a microscope equipped with means for heating the polymer. The specimen is heated slowly and the crystalline melt point is the temperature at which birefringence disappears.

The flexible liner which lines the inner surface of the mold can be made of rubber (including silicone rubber) or any flexible material which has a substantially lower heat conductivity than that of the mold. It is necessary that the heat conductivity of the liner which is in contact with the parison being heated be lower than that of the mold so that the liner can act as a buffer and thus bring about more uniform heating of the parison. The effect of any hot spots in the mold will be reduced or eliminated because of the presence of the low heat conductivity liner which retards the direct transfer of heat inward toward the parison and allows more lateral dissipation of the heat. Thus the heat is transferred inwardly and then laterally through the mold. In a preferred embodiment the heat conductivity of the liner while substantially lower than that of the mold is higher than that of the material comprising the parison. Thus, while the heat is transferred generally inwardly through the liner and into the parison, if the parison has a thick spot or a spot which for any reason absorbs a greater amount of heat, a portion of the heat can be conducted laterally along the flexible liner to this area which is absorbing more heat. For instance, in heating a parison which has a wall thickness at the closed end which is less than that of the rest of the parison, heat can be conducted along the flexible liner toward the area of greater thickness of the parison where more heat is being absorbed. Also, with a liner having a heat conductivity higher than that of the parison it is possible to supply heat to the parison as quickly as it is absorbed. Thus this arrangement makes possible the optimum in quick, uniform heating of the parison.

The mold can be formed of any suitable high heat conductivity material, such as aluminum, carbon steels, stainless steels, and copper.

Referring now to FIGURE 1, a parison 1 of thermoplastic material is shown having a closed end 2 and an open end. As previously mentioned, the parison can be composed of any thermoplastic material, such as polyethylene, polypropylene, polybutene and copolymers thereof. The thickness of the closed end 2, T', is less than that of the thickness of the walls, T.

Referring now to FIGURES 2a and 2b, mold 3 of high heat conductivity, having a flexible liner 4, defines a shape conforming to the shape of a parison 1 suitable for heating parison 1. Mold 3 is provided with electrical resistance elements 5 to provide means for heating the mold to a suitable temperature. Other heating means, such as a circulating fluid of heated material, can be provided instead of the resistance wires 5. A conduit 6 is connected to an air hose 7 which is adapted to provide means for fluid pressure to be introduced between the flexible liner 4 and the mold 3. In operation, after the parison 1 has been heated to a suitable temperature, fluid pressure is introduced through line 7 and conduit 6 to push the parison out of the mold. As can be seen in FIGURE 2b, the flexible liner 4 is peeled from the parison 1 as the parison is stripped from the mold. The fluid pressure in the area 8 pushes the flexible liner upwardly and, thus, peels the flexible liner from the parison 1.

Referring now to FIGURE 3a, mold halves 10 and 12 form a suitable mold cavity 11 for a blow molded thermoplastic article. A mandrel 13 holds parison 1 and introduces fluid pressure into the interior 14 of the parison.

Figure 3B:
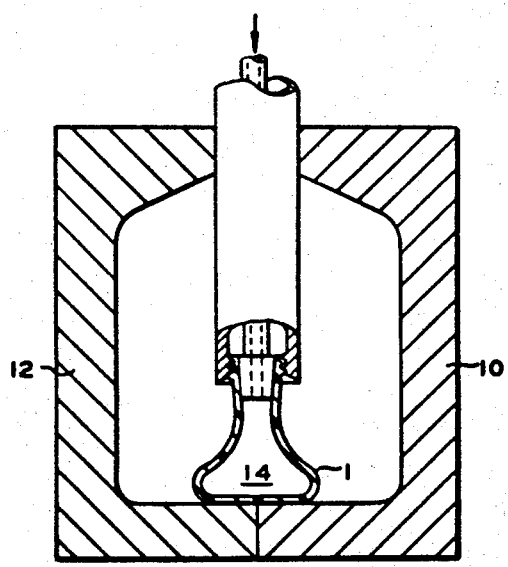
Figure 3C:
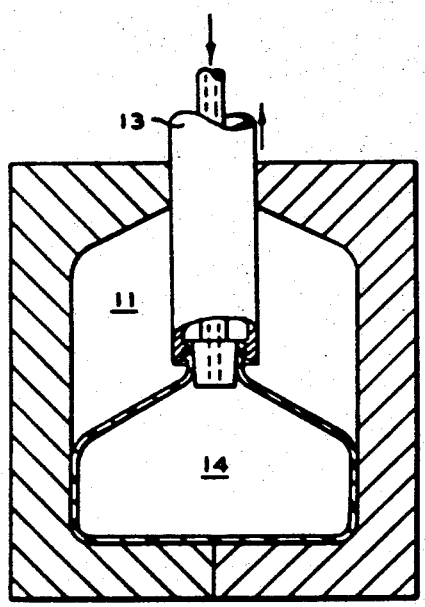
Figure 3D:
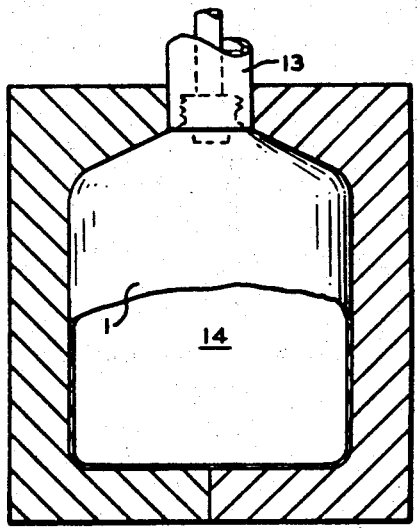

In operation, a parison 1 having a thinned end portion 2 is held on mandrel 13 and introduced into mold cavity 11. A differential pressure is introduced between parison interior 14 and mold cavity 11, causing the parison to expand. This pressure differential can be introduced by blow molding or vacuum molding. In the case of vacuum molding, suitable vacuum ports (not shown) can be included in the walls of mold halves 10 and 12. The first step of the blowing operation is shown in FIGURE 3b. As the parison 1 begins to expand, the thinned portion 2 expands first and comes into contact with the bottom of the mold cavity. Expansion of the parison 1 then takes place at areas adjacent to those areas in contact with the mold cavity. Thus, the area of thinned wall thickness expands first and those areas adjacent that area of thinned wall section expand next. As shown in FIGURE 3c, the mandrel 13 is withdrawn from the mold as blowing progresses. It can be seen from FIGURE 3c that the sides of the article are formed sequentially from the bottom to the top. This type of blowing operation produces a highly oriented thermoplastic article. The completely blown article is shown in FIGURE 3d. In FIGURE 3d, the mandrel 13 is completely withdrawn from the mold cavity and the parison 1 has been completely expanded to fill the mold cavity.

*Example*

A parison 3 inches long having one closed hemispherical end .594 inch in outside diameter and 0.065 inch thick and one open end .838 inch in outside diameter and 0.057 inch thick, the wall thickness tapering from the open end to a section .111 inch thick about 0.380 inch from the open end then tapering to the hemispherical end section, and the outside surface smoothly tapering, similar in appearance to that of FIGURE 1, was produced by conventional injection molding from polypropylene having a density of 0.905 gram per cc. and a melt flow (ASTM D1238–57T Condition L) of 6.5.

This parison was inserted into a heating device similar to that of FIGURE 2 having a block temperature of 335° F. and was heated for about 3.5 minutes. Air at about 5 p.s.i. pressure was introduced between the block and the liner thus forcing the parison upward and onto a blowing and thread forming mandrel where the threads were formed by clamping and pressing the neck mold member firmly together about the first 0.5 inch near the top of the parison.

The mandrel held parison, in the vertical position with the threads uppermost, was then enclosed in a 7 ounce bottle mold (a mold for a bottle which has a 7 ounce water capacity) and positioned near the bottom. Air under pressure was admitted to the inside of the parison and simultaneously the mandrel was raised with respect to the mold at a rate corresponding to the development of the blowing parison so as to come to the uppermost position within the mold in about the same time it takes the parison to fully develop into a blown bottle. This occurred in about 6 seconds. Two additional seconds were allowed for the mold to cool the bottle, after which the mold was opened and the bottle removed. The resulting bottle was filled with water, capped, and brought to a temperature of 35° F. and dropped three times onto a concrete surface from a height of 8 feet without breaking or subsequently leaking.

Another such bottle produced from the same polymer and in the same manner as the first was cut into tensile specimens. The wall samples showed tensile strengths varying between 10,000 and 20,000 pounds per square inch as compared to 5,000 to 6,000 p.s.i. for unoriented polypropylene.

Other bottles made by this same process from this same polymer were judged by several experts in the field of plastic packaging to have exceptional clarity for an unmodified polypropylene bottle.

Samples taken from bottles made by conventional blow molding of the same polymer exhibit tensile strength in the range of unoriented polymer, and such bottles break when filled with water, capped, brought to a temperature of 35° F. and dropped onto a concrete surface from a height of 8 feet.

While this invention has been described in detail for the purpose of illustration it is not to be construed as limited thereby, but is intended to cover all changes and modifications within the spirit and scope thereof.

I claim:

1. A method of uniformly heating a hollow thermoplastic parison comprising:
   placing said parison in contact with a flexible liner within a mold, said mold having a higher heat conductivity than said liner;
   heating said mold and transferring said heat through said liner into said parison until said parison is heated to a temperature just below the crystalline melting point of said thermoplastic material comprising said parison; and
   removing said parison from said mold.

2. The method according to claim 1 wherein said liner has a higher heat conductivity than said parison so as to transfer heat to areas of the parison having a greater capacity for absorbing heat.

3. The method according to claim 2 wherein fluid pressure is applied between said mold and said liner after said parison reaches the desired temperature and said liner pushes said parison from said mold so that said liner is peeled from said parison.

4. A method of uniformly heating a hollow thermoplastic parison comprising:
   placing said parison in contact with a flexible liner within a mold;
   heating said mold;
   transferring heat within said mold inwardly toward said liner and laterally through said mold along substantially the interface of said liner and said mold;
   transferring heat inwardly into said liner;
   thereafter transferring a portion of said heat on inwardly into said parison;
   transferring another portion of said heat laterally through said liner to points of greater heat absorption on said parison so as to heat said parison to a temperature just below the crystalline melting point of said thermoplastic material; and
   removing said parison from said mold.

5. A method according to claim 4 wherein fluid pressure is applied between said mold and said liner after said parison reaches the desired temperature and said liner pushes said parison from said mold so that said liner is peeled from said parison.

6. A method of uniformly heating a hollow thermoplastic parison comprising:

placing said parison in contact with a flexible liner within a mold, said mold having a higher heat conductivity than said liner;

heating said mold and transferring said heat through said liner into said parison until said parison is heated to a temperature of 1 to 50 degrees F. below the crystalline melting point of said thermoplastic material comprising said parison; and removing said parison from said mold.

References Cited

UNITED STATES PATENTS

| | | | |
|---|---|---|---|
| 2,181,821 | 11/1939 | Seals | 263—5 |
| 2,213,902 | 9/1940 | Daniels. | |
| 2,779,578 | 1/1957 | Corey | 263—5 |

JOHN J. CAMBY, *Acting Primary Examiner.*